(12) United States Patent
Hann et al.

(10) Patent No.: US 10,063,334 B2
(45) Date of Patent: Aug. 28, 2018

(54) METHOD AND A DEVICE FOR GENERATING A TIMING SIGNAL

(71) Applicants: Kenneth Hann, Espoo (FI); Heikki Laamanen, Espoo (FI)

(72) Inventors: Kenneth Hann, Espoo (FI); Heikki Laamanen, Espoo (FI)

(*) Notice: Subject to any disclaimer, the term of this patent is extended or adjusted under 35 U.S.C. 154(b) by 14 days.

(21) Appl. No.: 15/317,114

(22) PCT Filed: Jun. 18, 2015

(86) PCT No.: PCT/FI2015/000029
§ 371 (c)(1),
(2) Date: Dec. 7, 2016

(87) PCT Pub. No.: WO2015/193536
PCT Pub. Date: Dec. 23, 2015

(65) Prior Publication Data
US 2017/0134108 A1 May 11, 2017

Related U.S. Application Data

(60) Provisional application No. 62/014,187, filed on Jun. 19, 2014.

(30) Foreign Application Priority Data

Jun. 19, 2014 (EP) ................................ 20140173138

(51) Int. Cl.
*H04J 3/06* (2006.01)
*H04W 56/00* (2009.01)

(52) U.S. Cl.
CPC .......... *H04J 3/0641* (2013.01); *H04J 3/0644* (2013.01); *H04J 3/0658* (2013.01); *H04J 3/0667* (2013.01); *H04W 56/006* (2013.01)

(58) Field of Classification Search
CPC ...... H04J 3/0641; H04J 3/0644; H04J 3/0667; H04J 3/0658; H04W 56/006
See application file for complete search history.

(56) References Cited

U.S. PATENT DOCUMENTS

| 2008/0194273 A1* | 8/2008 | Kansal ................... G01C 21/20 455/456.3 |
| 2011/0068973 A1* | 3/2011 | Humphreys .......... G01S 19/215 342/357.3 |
| 2011/0305146 A1* | 12/2011 | Rausch .................. H04H 20/86 370/252 |

FOREIGN PATENT DOCUMENTS

EP          2 579 678 A1    4/2013

* cited by examiner

*Primary Examiner* — Thai Nguyen
(74) *Attorney, Agent, or Firm* — Shalom Wertsberger; Saltamar Innovations (57) ABSTRACT

A device and a method for generating a secondary timing signal that is synchronous with a primary timing signal are presented. The method comprises deriving (401) an auxiliary timing signal from an auxiliary signal received at a first site and correcting (402, 403) the timing phase of the auxiliary timing signal so as to obtain the timing phase for the secondary timing signal. The timing phase is corrected with the aid of the following a) a constant phase shift between the auxiliary timing signal and another auxiliary timing signal derived in a second site where both the primary timing signal and the auxiliary signal are available and b) a dynamic phase shift between the other auxiliary timing signal and the primary timing signal at the second site.

19 Claims, 4 Drawing Sheets

Figure 4 ns a the US of The mobile networks, the temporal difference between mutually
METHOD AND A DEVICE FOR GENERATING A TIMING SIGNAL

FIELD OF THE INVENTION

The invention relates to a method and to a device for generating a secondary timing signal which is synchronous with a primary timing signal. Furthermore, the invention relates to a computer program for generating a secondary timing signal which is synchronous with a primary timing signal. Furthermore, the invention relates to network element of a data transfer network.

BACKGROUND

In many cases, there is a need to synchronize timing signals maintained in network elements of a data transfer network in such a way that the timing phases of the timing signals are equal to each other with a sufficient accuracy. For example, in mobile networks of the new generation, a prerequisite for reliable data transfer to and from a mobile terminal device moving from a service area of one base station to a service area of another base station is that the difference between timing phases of the timing signals of these base stations is at most 1 microsecond. Each timing signal comprises typically a train of timing points pitched at substantially uniform temporal intervals. The timing points can be e.g. rising or descending edges of pulses or zero-crossings of a waveform, etc. Thus, in the above-mentioned mobile networks, the temporal difference between mutually corresponding timing points of the timing signals maintained in the base stations should be at most the above-mentioned 1 microsecond.

In one prior art solution, network elements, e.g. base stations, which need to maintain mutually synchronized timing signals are provided with radio receivers for receiving timing information from one or more satellites of a satellite system. The received timing information enables each network element to maintain a timing signal which is synchronous with corresponding timing signals prevailing in the other network elements. The satellite system can be for example the US Global Positioning System "GPS", the Russian GLONASS, the European Galileo system, or the Chinese Beidou system. A network element may, however, become incapable of utilizing the timing information transmitted by the satellite system because of e.g. radio jamming and/or some other reasons. Therefore, there is a need for a backup system for generating a sufficiently accurate secondary timing signal during time intervals when the network element is incapable of utilizing the timing information transmitted by the satellite system.

The specification 1588-2008 of the Institute of Electrical and Electronics Engineers "IEEE 1588-2008" defines a protocol for maintaining mutually synchronized timing signals in network elements of a data transfer network. In accordance with the IEEE 1588-2008 protocol, the network elements send timestamp messages to each other. Based on the timestamp messages each network element controls the timing signal it maintains. The calculation of the difference between the timing phases of timing signals maintained in two network elements is based on an assumption that data transfer times are equal in both directions between the network elements under consideration. In packet-, frame-, and cell-switched data transfer networks, the above-mentioned assumption related to the transfer times does not often hold true with a sufficient accuracy because the data transfer time has a remarkable random-type portion and, in addition, data transfer paths between two network elements, routed to opposite transfer directions, may have different lengths and/or numbers of hops. The above-mentioned random-type portion is due to for example changes in routes configured in the data transfer network and queuing delays subjected to data packets, frames, or cells in transmission buffers and/or reception buffers of the network elements. Due to the above-mentioned reasons, the IEEE 1588-2008 protocol is typically not suitable for generating a sufficiently accurate secondary timing signal when the network element is incapable of utilizing the timing information transmitted by the satellite system.

The specification ITU-T G.8275.1 of the International Telecommunication Union "G.8275.1" defines a protocol for maintaining mutually phase-synchronized timing signals in network elements of a data transfer network. The G.8275.1 protocol is based on the IEEE 1588-2008 protocol, the main difference being in that the timestamp messages are terminated at the receiving end of each Ethernet link between the network elements, and the timing frequency and phase are regenerated at each intermediate network element. Hence, the phase inaccuracy due to indeterminate queuing delays and asymmetric data paths is eliminated. The G.8275.1 protocol, however, requires that each network element is able to operate according the G.8275.1 protocol making it impossible to utilize the protocol in existing networks with older network elements.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention there is provided a new device for generating a secondary timing signal which is synchronous with a primary timing signal. A device according to the invention comprises a processing system configured to:

derive an auxiliary timing signal from an auxiliary signal received at a first site, and correct the timing phase of the auxiliary timing signal so as to obtain the timing phase for the secondary timing signal.

The processing system is configured to correct the timing phase of the auxiliary timing signal with:

a corrective timing phase based on one or more timing phases of one or more other auxiliary timing signals derived from the auxiliary signal received at one or more second sites, the timing phases of the other auxiliary timing signals expressing phase-shifts of the other auxiliary timing signals with respect to the primary timing signal received at the second sites, and a corrective constant being an estimate of a difference between the timing phase of the auxiliary timing signal and the corrective timing phase.

The above-mentioned corrective timing phase is used for keeping the secondary timing signal phase-locked with respect to the primary timing signal. The phase-locking is based on that the timing phases of the auxiliary timing signals derived from the auxiliary signal at different sites change with respect to the reference signal in a substantially same way. In other words, the phase-shifts between the auxiliary timing signals derived from the auxiliary signal at different sites are substantially constants. Thus, the timing phase of the auxiliary timing signal which is derived from the auxiliary signal received at the first site can be corrected with the corrective timing phase which depends on, when considered over time, how one or more timing phases of corresponding other auxiliary timing signal or signals is/are changing with respect to the reference signal at the one or more second sites.

The above-mentioned corrective constant is used for setting the timing phase of the secondary timing signal so that the timing phase equals to that of the primary timing signal with a sufficient accuracy. As mentioned above, the phase-shifts between the auxiliary timing signals derived from the auxiliary signal at different sites are substantially constants. Therefore, a constant value, i.e. the corrective constant, can be used as the estimate of the substantially constant difference between the timing phase of the auxiliary timing signal and the corrective timing phase. A more illustrative description of the principle of the invention will be given later in this document.

The above-described device according to the invention can be used for constructing for example a backup system which is configured to generate a secondary timing signal in a network element when the network element is pro tempore incapable of utilizing timing information transmitted by a satellite system or some other primary timing source. In this exemplifying and non-limiting application of the device according to the invention, the above-mentioned first site represents the above-mentioned network element and the one or more second sites represent one or more other network elements. The above-mentioned primary timing signal represents the timing information transmitted by the primary timing source, and the above-mentioned auxiliary signal is a signal which is received at each network element and whose timing phase changes with respect to the primary timing signal in a sufficiently same way in each network element. The auxiliary signal can be for example a radio signal transmitted by a radio station of a suitable terrestrial radio system such as e.g. the LORAN-C, the eLORAN, the WWVB, or the DFC-77. The LORAN-C is a radio navigation system which allows a receiver to determine its position by listening to low frequency radio signals transmitted by fixed land-based radio beacons, the eLORAN is an enhanced generation of the LORAN-C, the WWVB is a US time signal radio station, and DFC-77 is a German long-wave time signal and standard-frequency radio station. It is also possible that the auxiliary signal is an amplitude modulated "AM" broadcast radio signal. Furthermore, it is also possible that the primary timing source transmitting the primary timing signal is e.g. a LORAN-C radio station and the auxiliary signal is an amplitude modulated "AM" radio signal transmitted by a broadcast radio station. For an additional example, the auxiliary signal can be a frequency modulated "FM" radio signal with zero mean phase deviation so that the long-term mean radio signal frequency is equal to the center frequency. For one additional example, the auxiliary signal can be the pilot tone of an FM stereo broadcast signal.

For another example, the above-described device according to the invention can be used for constructing a synchronization system of a network element that does not comprise means for utilizing the primary timing signal transmitted by the primary timing source and/or that is located on a shadow area of the primary timing signal and thus is constantly incapable of receiving the primary timing signal. In this exemplifying and non-limiting application of the device according to the invention, the network element under consideration uses constantly the secondary timing signal generated by the device on the basis of the auxiliary signal and information received from one or more other network elements which is/are capable of utilizing the primary timing signal. A more illustrative description will be given later in this document.

It is worth noting that the above-mentioned auxiliary signal is not necessarily a radio signal. In conjunction with the present invention, the auxiliary signal can be any suitable signal that can be delivered to different sites, e.g. to network elements, so that the phase-shift or phase-shifts between the auxiliary timing signals derived from the auxiliary signal at these sites is/are substantially constant or constants.

Furthermore, the invention is not limited to any particular type of the primary timing signal and neither to any particular way of transferring the primary timing signal. The task of the present invention is to provide a secondary timing signal whose timing phase equals to that of the primary timing signal with a sufficient accuracy irrespective of the quality, source, way of transfer, and other features of the primary timing signal. Thus, the primary timing signal can be transmitted e.g. by a satellite system or some other radio system, or the primary timing signal can be transferred e.g. with an electrical or optical wire in a data transfer network. In an exemplifying and non-limiting special case, only one of sites is capable of utilizing the primary timing signal and each of the other sites uses the secondary timing signal generated at the other site under consideration on the basis of the auxiliary timing signal received at all of the sites and information received from the particular one of the sites that is capable of utilizing the primary timing signal. It is straightforward to understand that in this exemplifying special case, where the primary timing signal is used at only one site, there is no requirement that the primary timing signal should be such a signal which can be delivered to the different sites so that it has a same timing phase at all of these sites.

In accordance with the invention there is provided also a new network element that can be for example a base station of a mobile network and the network element can be configured to support one or more of the following: the Internet Protocol "IP", the Ethernet, the Multiprotocol Label Switching "MPLS", the Asynchronous Transfer Mode "ATM", and/or the optical packet switching. A network element according to the invention comprises:

a data transfer interface for transmitting data to a data transfer network and for receiving data from the data transfer network, a receiver, e.g. a radio receiver, for receiving an auxiliary signal, and a control system comprising a device according to the invention for generating a secondary timing signal that is synchronous with a primary timing signal, the secondary timing signal being based on the auxiliary signal and correction data received from the data transfer network.

The correction data contains information concerning one or more timing phases of one or more auxiliary timing signals derived from the auxiliary signal in one or more other network elements of the data transfer network.

A network element according to an exemplifying and non-limiting embodiment of the invention further comprises a receiver, e.g. a radio receiver, for receiving the primary timing signal too.

In accordance with the invention there is provided also a new method for generating a secondary timing signal which is synchronous with a primary timing signal. A method according to the invention comprises:

deriving an auxiliary timing signal from an auxiliary signal received at a first site, and correcting the timing phase of the auxiliary timing signal so as to obtain the timing phase for the secondary timing signal.

The timing phase of the auxiliary timing signal is corrected with:

a corrective timing phase based on one or more timing phases of one or more other auxiliary timing signals derived from the auxiliary signal received at one or more second sites, the timing phases of the other auxiliary timing signals expressing phase-shifts of the other auxiliary timing signals with respect to the primary timing signal received at the second sites, and a corrective constant being an estimate of a difference between the timing phase of the auxiliary timing signal and the corrective timing phase.

In accordance with the invention there is provided also a new computer program for generating a secondary timing signal which is synchronous with a primary timing signal. A computer program according to the invention comprises computer executable instructions for controlling a programmable processing system to:

derive an auxiliary timing signal from an auxiliary signal received at a first site, and correct the timing phase of the auxiliary timing signal so as to obtain the timing phase for the secondary timing signal.

The computer program comprises computer executable instructions for controlling the programmable processing system to correct the timing phase of the auxiliary timing signal with:

a corrective timing phase based on one or more timing phases of one or more other auxiliary timing signals derived from the auxiliary signal received at one or more second sites, the timing phases of the other auxiliary timing signals expressing phase-shifts of the other auxiliary timing signals with respect to the primary timing signal received at the second sites, and a corrective constant being an estimate of a difference between the timing phase of the auxiliary timing signal and the corrective timing phase.

A computer program product according to the invention comprises a non-volatile computer readable medium, e.g. a compact disc "CD", encoded with a computer program according to the invention.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verb "to comprise" is used in this document as an open limitation that neither excludes nor requires the existence of also un-recited features. The features recited in dependent claims are mutually freely combinable unless otherwise explicitly stated.

BRIEF DESCRIPTION OF FIGURES

Exemplifying and non-limiting embodiments of the invention and their advantages are explained in greater detail below with reference to the accompanying drawings, in which.

DESCRIPTION OF EXEMPLIFYING EMBODIMENTS

Figure 1:
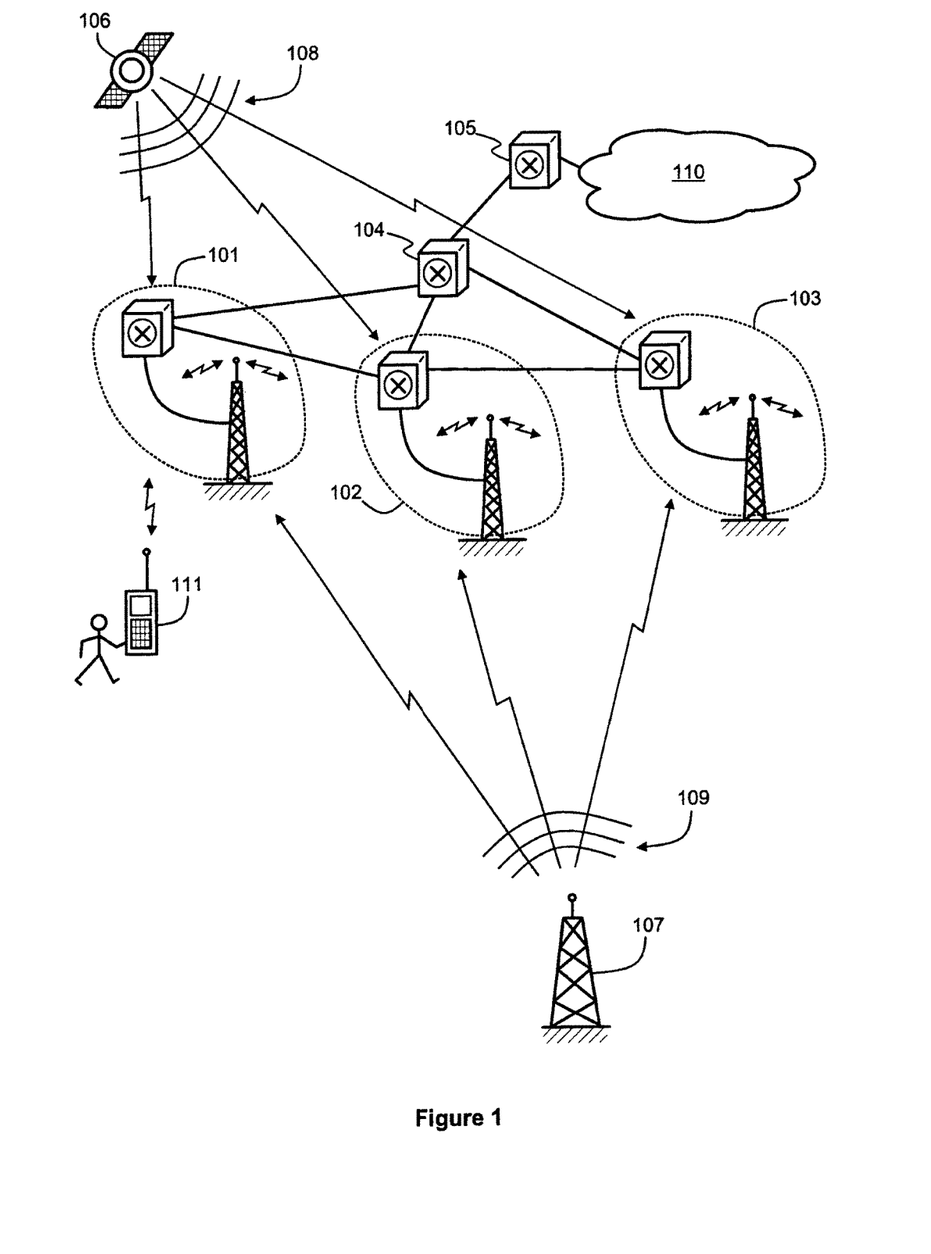
FIG. 1 shows a schematic illustration of an exemplifying data transfer network comprising network elements according to an exemplifying and non-limiting embodiment of the invention.

FIG. 1 shows a schematic illustration of an exemplifying data transfer network that comprises network elements 101, 102, 103, 104, and 105. The network elements 101-105 are mutually interconnected with data transfer links as illustrated in FIG. 1. Furthermore, the data transfer network may comprise other network elements that are not shown in FIG. 1. Each of the network elements may be e.g. an Internet Protocol "IP" router, a multiprotocol label switching "MPLS" node, a packet optical switch, an Asynchronous Transfer Mode "ATM" switch, and/or an Ethernet switch. Each network element may consist of a single apparatus or a combination of a plurality of apparatuses. The network elements 101-103 are base stations for providing radio connections to mobile terminal devices such as e.g. a mobile phone 111. The network element 105 is arranged to act as a gateway to an external network 110 that can be e.g. the global Internet.

In this exemplifying and non-limiting data transfer network, each of the network elements 101-103 comprises a first radio receiver for receiving a primary timing signal 108 from a satellite system and a second radio receiver for receiving an auxiliary signal 109 from a terrestrial radio system. Thus, in this exemplifying case, the satellite system is a primary timing source and the terrestrial radio system is an auxiliary timing source. It is, however, also possible that the primary timing source is a first terrestrial radio system and the auxiliary timing source is a second terrestrial radio system. The satellite system can be for example the US Global Positioning System "GPS", the Russian GLONASS, the European Galileo system, or the Chinese Beidu system. In FIG. 1, one of the satellites of the satellite system is denoted with a reference number 106. The terrestrial radio system can be for example the LORAN-C, the eLORAN, the WWVB, the DFC-77, or a broadcast radio station transmitting an amplitude modulated "AM" radio signal. In FIG. 1, a radio station of the terrestrial radio system is denoted with a reference number 107.

Each of the network elements 101-103 is configured to derive an auxiliary timing signal from the auxiliary signal 109 so that the timing phase of the auxiliary timing signal changes sufficiently slowly with respect to the primary timing signal 108. The auxiliary timing signal can be derived from the auxiliary signal 109 for example by recognizing repetitive waveform patterns from the auxiliary signal so as to produce a preliminary timing signal and possibly, if needed, by using a suitable frequency multiplier and/or a frequency divider for changing the frequency of the preliminary timing signal in order to achieve a situation in which the timing phase of the auxiliary timing signal changes sufficiently slowly with respect to the primary timing signal 108. In cases, where the auxiliary signal 109 is an amplitude modulated "AM" radio signal, the auxiliary timing signal can be produced by changing the carrier wave frequency with a suitable frequency divider and/or a frequency multiplier. It is also possible that, in addition to the network elements 101-103, one or more other network elements of the data transfer network are provided with radio receivers for receiving the primary timing signal 108 and the auxiliary signal 109 and are configured to derive an auxiliary timing signal from the received auxiliary signal.

During the normal operation, the network elements utilize the primary timing signal 108 for maintaining the synchronization between each other. Without limiting the generality, we can assume for example that the first network element 101 becomes incapable of utilizing the primary timing signal 108 and that the second network elements 102 and 103 remain capable of utilizing the primary timing signal 108. The network element 101 may lose its ability to utilize the primary timing signal 108 because of for example radio jamming and/or some other reason.

Figure 2:
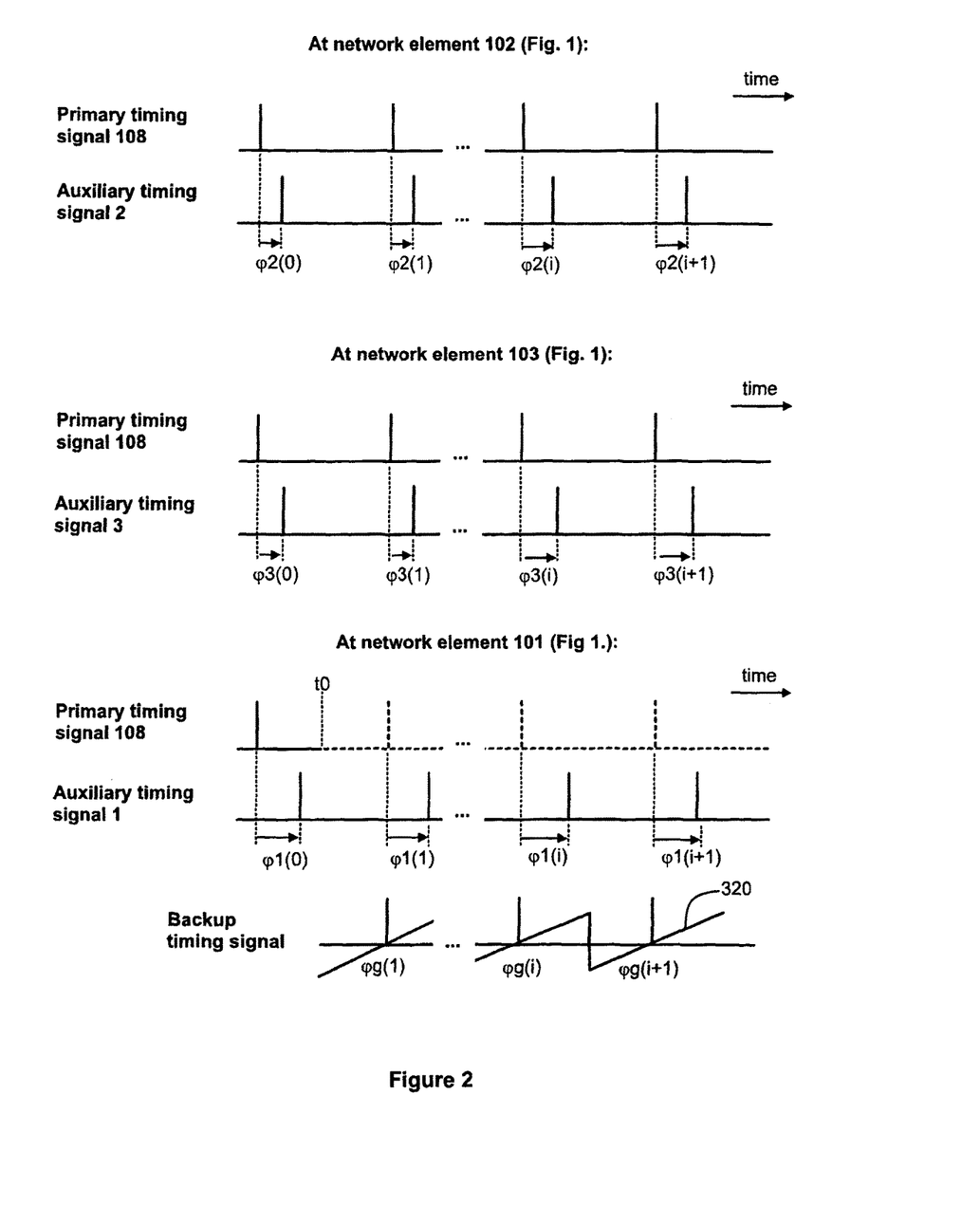
FIG. 2 shows an exemplifying timing diagram illustrating the principle utilized in exemplifying and non-limiting embodiments of the invention.

FIG. 2 presents an exemplifying timing diagram which illustrates timing signals present at the network elements 101, 102, and 103 in an exemplifying situation. FIG. 2 does not show the waveforms of the timing signals but the timing information contained by each timing signal is depicted with a train of vertical lines representing the timing points of the timing signal under consideration, e.g. rising or descending edges of pulses, zero-crossings of a waveform, etc. The timing information contained by a timing signal may constitute for example a pulse-per-second "PPS" signal. As assumed above, the network elements 102 and 103 remain capable of utilizing the primary timing signal 108 and the network element 101 becomes incapable of utilizing the primary timing signal 108. In FIG. 2, this is depicted so that the primary timing signal 108 received at the network elements 102 and 103 is illustrated with solid lines and the primary timing signal 108 received at the network element 101 is illustrated with a solid line up to the time instant t0 at which the ability to utilize the primary timing signal 108 is lost and with a dashed line after this time instant. In FIG. 2, the auxiliary timing signal derived by the network element 101 from the auxiliary signal 109, FIG. 1, is denoted as auxiliary timing signal 1, the auxiliary timing signal derived by the network element 102 is denoted as auxiliary timing signal 2, and the auxiliary timing signal derived by the network element 103 is denoted as auxiliary timing signal 3. The timing phase φ1 of the auxiliary timing signal 1 is depicted with timing phase values φ1(0), φ1(1), . . . , φ1(i), φ1(i+1), where "i" is an index identifying a timing point of the primary timing signal 108. Correspondingly, the timing phase φ2 of the auxiliary timing signal 2 is depicted with timing phase values φ2(0), φ2(1), . . . , φ2(i), φ2(i+1), and the timing phase φ3 of the auxiliary timing signal 3 is depicted with timing phase values φ3(0), φ3(1), . . . , φ3(i), φ3(i+1). In this exemplifying case, the timing phases are defined with respect to the primary timing signal 108 as illustrated in FIG. 2. It is worth noting that the timing phase values φ1(1), . . . , φ1(i), φ1(i+1) cannot be determined by comparing the auxiliary timing signal 1 to the primary timing signal 108 because the primary timing signal is no more utilizable in the network element 101.

The timing phases of the auxiliary timing signals 1, 2, and 3 illustrated in FIG. 2 are assumed to change over time in a mutually same way. In other words, the phase-shifts between the auxiliary timing signals related to different network elements are assumed to be constants. This assumption is justified by the fact that mutual differences between signal propagation times from the radio station 107 shown in FIG. 1 to the network elements remain substantially constants over time, i.e. the signal propagation times vary over time in a substantially same way with respect to each other. This, in turn, is caused by the fact that the distances from the radio station 107 to the network elements are significantly greater than the distances between the network elements. Thus, from the viewpoint of the radio station 107, all the network elements under consideration are located in substantially same place. The distances from the radio station 107 to the network elements can be for example more than thousand kilometers whereas the distances between the network elements can be on the range from few hundred meters to few tens of kilometers. The distances from the radio station 107 to the network elements are advantageously at least one hundred times longer than the longest distance between the network elements.

The network element 101 is configured to correct the timing phase φ1 of the auxiliary timing signal 1 so as to obtain the timing phase φg for a secondary timing signal which has to be sufficiently synchronous with the primary timing signal 108. In FIG. 2, the timing phase φg of the secondary timing signal is depicted with timing phase values φg(1), . . . , φg(i), φg(i+1). In the network element 101, the secondary timing signal is used as a substitute of the primary timing signal 108 when the network element 101 is incapable of utilizing the primary timing signal 108. The timing phase φ1 of the auxiliary timing signal 1 is corrected with a corrective timing phase φc so as to maintain phase-locking between the secondary timing signal and the primary signal. The timing phase φ1 is further corrected with a corrective constant C so as to remove a constant difference from between the timing phases of the secondary timing signal and the primary timing signal.

For the sake of illustration, we first consider an exemplifying case where the above-mentioned corrective timing phase φc is the timing phase φ2 of the auxiliary timing signal 2. As mentioned above, the auxiliary timing signals 1 and 2 are assumed to change over time in a substantially same way. Therefore, for example:

$$\Delta\varphi 1=\varphi 1(i)-\varphi 1(j)=\Delta\varphi 2=\varphi 2(i)-\varphi 2(j), \quad (1)$$

where i and j are indexes identifying two separate timing points of the primary timing signal 108. From equation (1) we get:

$$\varphi 1(i)=\varphi 2(i)+\varphi 1(j)-\varphi 2(j). \quad (2)$$

Therefore, even if the primary timing signal 108 is not available in the network element 101, the timing phase φ1 of the auxiliary timing signal 1 with respect to the primary timing signal 108 can be computed on the basis of the timing phase φ2 of the auxiliary timing signal 2 and the phase difference φ1(j)−φ2(j) between the auxiliary timing signals 1 and 2. As mentioned above, the phase shifts between the auxiliary timing signals related to different network elements are assumed to be constants. Therefore, the phase difference φ1(j)−φ2(j) can be estimated with a constant which is independent of the index j. This constant can be determined, or information for determining this constant can be obtained, when the network element 101 is capable of utilizing the primary timing signal 108, i.e. prior to the time instant t0 when the ability to utilize the primary timing signal 108 is lost. Thus, the index j represents such a timing point of the primary timing signal 108 which is prior to the time instant when the ability to utilize the primary timing signal 108 was lost. The above-mentioned constant represents the above-mentioned corrective constant C that is the estimate of the substantially constant difference between the timing phase φ1 of the auxiliary timing signal 1 and the corrective timing phase φc.

It is worth noting that the corrective constant C does not have to be based on only one value of the phase difference between auxiliary timing signals 1 and 2. It is also possible to compute many values of the phase difference corresponding to mutually different time instants when the network element 101 is capable of utilizing the primary timing signal 108. Thereafter, the corrective constant C can be computed on the basis of the values of the phase difference. The corrective constant C can be for example a weighted or non-weighted arithmetic mean of the values of the phase difference. For another example, values of the phase difference can be computed corresponding to substantially uniformly pitched time instants and the computed values can be filtered with a suitable digital filter so as to obtain the corrective constant C. The advantage of determining the corrective constant C on the basis of many values of the phase difference is that the effect of stochastic errors which may be present in individual values of the phase difference is mitigated.

The timing phase φ1 of the auxiliary timing signal 1 is corrected with the corrective timing phase φc and the corrective constant C so as to obtain the timing phase φg for the secondary timing signal. The corrected timing phase is:

$$\varphi g(i) = \varphi 1(i) - \varphi c(i) - C, \quad (3)$$

where φc(i)=φ2(i) and C=φ1(j)−φ2(j) in this exemplifying case. Substituting equation (2) into equation (3) yields φg(i)=0. Thus, the timing phase φg of the secondary timing signal is the same as the timing phase of the primary timing signal 108 and therefore the secondary timing signal can be used as a substitute of the primary timing signal for example in a case where the network element 101 is incapable of utilizing the primary timing signal.

In a case where there are two or more network elements whose auxiliary timing signals can be used for correcting the timing phase of the auxiliary timing signal 1, equation (2) can be replaced with the following set of equations:

$$\varphi 1(i) = \varphi 2(i) + \varphi 1(j) - \varphi 2(j),$$

$$\varphi 1(i) = \varphi 3(i) + \varphi 1(j) - \varphi 3(j),$$

. . .

$$\varphi 1(i) = \varphi N(i) + \varphi 1(j) - \varphi N(j), \quad (4)$$

where N is the number of the network elements including the network element 101. Each of the equations (4) can be multiplied with one of weight coefficients $w_1, w_2, \ldots, w_{N-1}$ whose sum is one, and thereafter the left sides of equations (4) and be summed together and correspondingly the right sides of equations (4) can be summed together. This leads to the following equation:

$$\varphi 1(i) = \sum_{k=2}^{N} w_{k-1} \varphi k(i) + \varphi 1(j) - \sum_{k=2}^{N} w_{k-1} \varphi k(j). \quad (5)$$

In this exemplifying case, the weighted arithmetic mean of the timing phases φ2(i), . . . , and φN(i) is the corrective timing phase φc(i). As each of the differences φ1(j)−φ2(j), φ1(j)−φ3(j), . . . , and φ1(j)−φN(j) is independent of the index j, the difference between φ1(j) and the weighted arithmetic mean of φ2(j), . . . , and φN(j) is also independent of the index j. Therefore, the difference between φ1(j) and the weighted arithmetic mean of φ2(j), . . . , and φN(j) can be estimated with a constant which is independent of the index j. This constant can be determined, or information for determining this constant can be obtained, when the network element 101 is capable of utilizing the primary timing signal 108, i.e. prior to the time instant t0 when the ability to utilize the primary timing signal 108 is lost. Thus, the index j represents such a timing point of the primary timing signal 108 which is prior to the time instant t0 when the ability to utilize the primary timing signal 108 was lost. The above-mentioned constant represents the above-mentioned corrective constant C that is the estimate of the substantially constant difference between the timing phase φ1 of the auxiliary timing signal 1 and the corrective timing phase φc.

In a simple case, all the weight coefficients $w_1, w_2, \ldots, w_{N-1}$ have a same value and thereby the corrective timing phase φc is the arithmetic mean of φ2(i), . . . , and φN(i). In a more advanced case, the weight coefficients can be dependent on for example distances from the network element 101 to the other network elements so that a longer distance corresponds to a smaller weight coefficient and a shorter distance corresponds to a greater weight coefficient. The advantage of using information received from many network elements is that the effect of stochastic errors which may be present in the timing phases φ2(i), . . . , and φN(i) is mitigated.

It is worth noting that the corrective constant C does not have to be based on only one value of the difference between the timing phase φ1 and the corrective timing phase φc. It is also possible to compute many values of the difference corresponding to mutually different time instants when the network element 101 is capable of utilizing the primary timing signal 108. Thereafter, the corrective constant C can be computed on the basis of the values of the difference. The corrective constant C can be for example a weighted or non-weighted arithmetic mean of the values of the difference. For another example, values of the above-mentioned difference can be computed corresponding to substantially uniformly pitched time instants and the computed values can be filtered with a suitable digital filter so as to obtain the corrective constant C. The advantage of determining the corrective constant C on the basis of many values of the above-mentioned difference is that the effect of stochastic errors which may be present in individual values of the difference is mitigated.

The above-presented way to determine the corrective constant C is not the only possible choice. Another exemplifying way to determine the corrective constant C is based on distances from the source of the auxiliary signal to the network elements under consideration and the propagation speed of the auxiliary signal. In the exemplifying case illustrated in FIG. 1, the source of the auxiliary signal is the radio station 107. For example, the phase-shift between the auxiliary timing signal 1 and the auxiliary timing signal 2 can be estimated as:

$$\varphi1(j)-\varphi2(j)=(D1-D2)/v, \quad (6)$$

where D1 is the distance from the radio station 107 to the network element 101, D2 is the distance from the radio station 107 to the network element 102, and v is the propagation speed of the auxiliary signal 109. Applying the above-presented principle in equations (4) yields:

$$\varphi1(i)-\varphi2(i)=\varphi1(j)-\varphi2(j)=\varphi2(i)=(D1-D2)/v,$$

$$\varphi1(i)=\varphi3(i)+\varphi1(j)-\varphi3(j)=\varphi3(i)+(D1-D3)/v,$$

...

$$\varphi1(i)=\varphi N(i)+\varphi1(j)-\varphi N(j)=\varphi N(i)+(D1-DN)/v, \quad (7)$$

where D1, D2, ..., and DN are the distances from the source of the auxiliary signal to the network elements. Each of the equations (7) can be multiplied with one of the weight coefficients $w_1, w_2, \ldots, w_{N-1}$ whose sum is one, and thereafter the left sides of equations (7) and be summed together and correspondingly the right sides of equations (7) can be summed together. This leads to the following equation:

$$\varphi1(i) = \sum_{k=2}^{N} w_{k-1}\varphi k(i) + \left(D1 - \sum_{k=2}^{N} w_{k-1}Dk\right)\bigg/v. \quad (8)$$

In this exemplifying case, the weighted arithmetic mean of the timing phases $\varphi2(i), \ldots,$ and $\varphi N(i)$ is the corrective timing phase $\varphi c(i)$. By comparing equation (8) to equation (5) in light of equations (7) it can be seen that the corrective constant C which is the estimate of the substantially constant difference between the timing phase $\varphi1$ and the corrective timing phase $\varphi c$ is:

$$C = \left(D1 - \sum_{k=2}^{N} w_{k-1}Dk\right)\bigg/v. \quad (9)$$

The above-presented exemplifying way to determine the corrective constant C on the basis of the distances and the propagation speed is especially advantageous if the network element 101 were such a network element which is not provided with means for utilizing the primary timing signal 108 and/or which is located on a shadow area of the primary timing signal and thus is constantly incapable of receiving the primary timing signal. This way to determine the corrective constant C is applicable in cases where the auxiliary signal is such that the auxiliary timing signals which have, with respect to each other, constant phase-shifts determined by the distances and the propagation speed, can be derived from the auxiliary signal without the presence of the primary timing signal, i.e. the primary timing signal is not needed for deriving the auxiliary timing signals.

Figure 3:
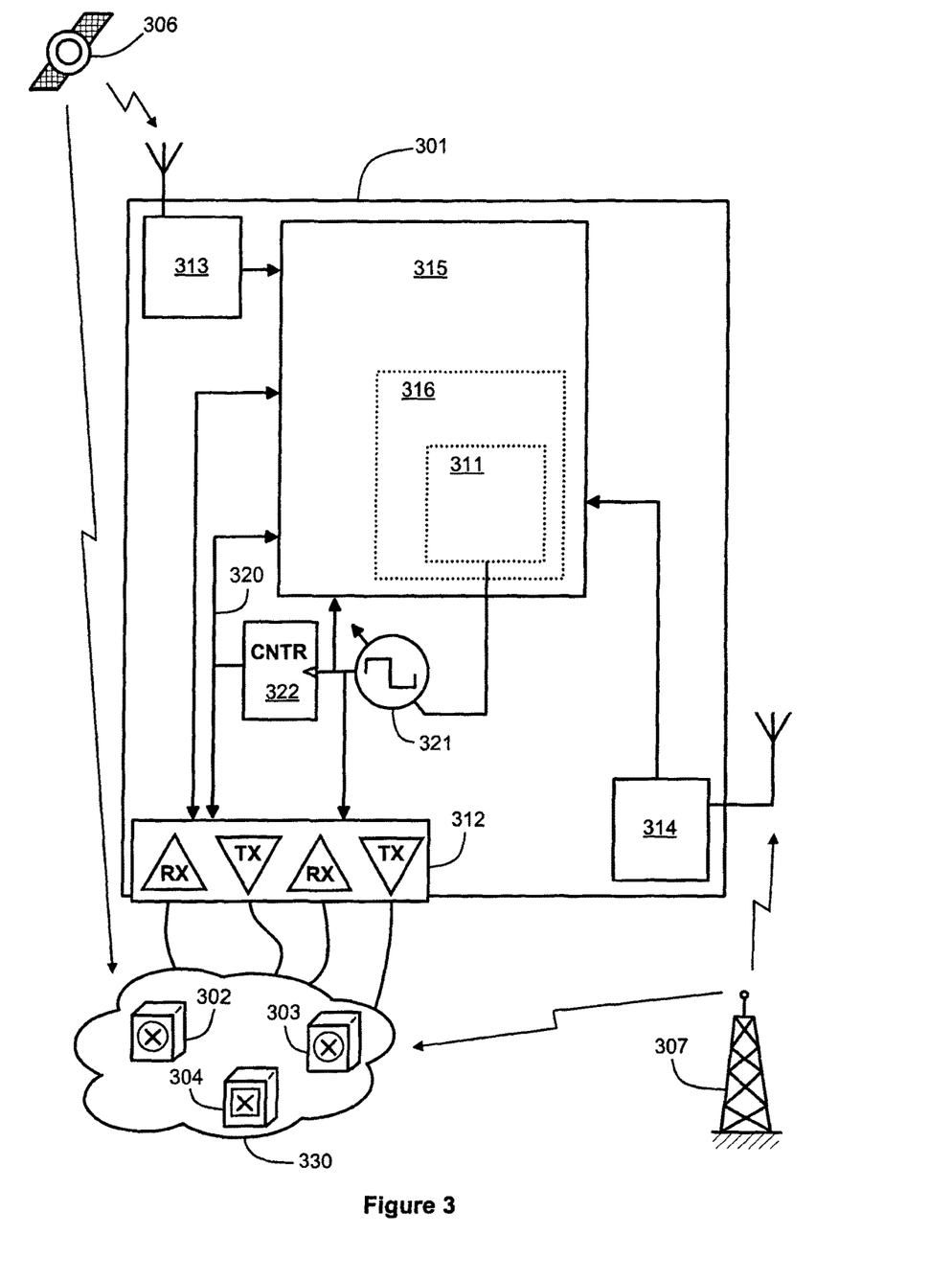
FIG. 3 shows a schematic block diagram of a network element according to an exemplifying and non-limiting embodiment of the invention.

FIG. 3 shows a schematic block diagram of a first network element 301 according to an exemplifying and non-limiting embodiment of the invention. The network element can be for example a base station of a mobile network and the network element can be configured to support one or more of the following: the Internet Protocol "IP", the Ethernet, the Multiprotocol Label Switching "MPLS", the Asynchronous Transfer Mode "ATM", and/or the optical packet switching. In the exemplifying case illustrated in FIG. 3, the network element 301 is a single apparatus but the network element could as well be a combination of a plurality of apparatuses. The network element comprises a data transfer interface 312 for transmitting data to a data transfer network 330 and for receiving data from the data transfer network. The network element comprises a receiver 314 for receiving an auxiliary signal. In this exemplifying and non-limiting case, the receiver 314 is a radio receiver for receiving the auxiliary signal from a terrestrial radio system. In FIG. 3, a radio station of the terrestrial radio system is denoted with a reference number 307. The network element comprises a control system 315 for controlling data forwarding and other functionalities of the network element. The control system 315 comprises a device 316 for generating a secondary timing signal which is synchronous with a primary timing signal. In this exemplifying and non-limiting case, the primary timing signal is constituted by timing information transmitted by a satellite system. In FIG. 3, one of the satellites of the satellite system is denoted with a reference number 306. The secondary timing signal is generated on the basis of the auxiliary signal and correction data received from the data transfer network 330.

The device 316 comprises a processing system 311 configured to derive an auxiliary timing signal from the auxiliary signal received from the radio station 307. The processing system 311 is configured to correct the timing phase of the auxiliary timing signal so as to obtain the timing phase for the secondary timing signal. The processing system is configured to correct the timing phase of the auxiliary timing signal with a corrective timing phase $\varphi c$ so as to maintain phase-locking between the secondary timing signal and the primary timing signal and also with a corrective constant C so as to remove a constant difference from between the timing phases of the secondary timing signal and the primary timing signal. The corrective timing phase $\varphi c$ is based on one or more timing phases of one or more other auxiliary timing signals derived from the auxiliary signal received at one or more other network elements such as e.g. second network elements 302 and 303. Hereinafter, we assume that the timing phases of the auxiliary timing signals of the network elements 302 and 303 are used for generating the secondary timing signal in the network element 301. The timing phases of the auxiliary timing signals of the network elements 302 and 303 express the phase-shifts of these auxiliary timing signals with respect to the primary timing signal received at the network elements 302 and 303. The above-mentioned corrective constant C is an estimate of the substantially constant difference between the timing phase of the auxiliary timing signal of the network element 301 and the above-mentioned corrective timing phase $\varphi c$. In the exemplifying case illustrated in FIG. 3, the processing system 311 is configured to control a clock signal generator 321 on the basis of the correction phase shift $\varphi c$ and the corrective constant C. The clock signal generator 321 can be controlled for example so that zero-crossings of an output signal 320 of a counter 322 coincide with the timing points of the primary timing signal. The output signal 320 of the counter is illustrated in FIG. 2. In this case, the output signal 320 of the counter is considered to be a signed value.

A network element according to an exemplifying and non-limiting embodiment of the invention comprises a receiver 313 for receiving the primary timing signal. In this exemplifying and non-limiting case, the receiver 313 is a radio receiver for receiving the primary timing signal from the satellite system. The network element is advantageously configured to use the primary timing signal received from the satellite system when the reception of the primary timing signal at the network element meets a predetermined quality criterion, and to use the secondary timing signal in lieu of the primary timing signal when the reception of the primary timing signal does not meet the predetermined quality criterion, i.e. the network element is incapable of utilizing the primary timing signal.

In a network element according to an exemplifying and non-limiting embodiment of the invention, the processing system 311 is configured to compute the corrective constant C on the basis of one or more instantaneous values of the timing phase of the auxiliary timing signal of the network element 301 and respective one or more instantaneous values of the corrective timing phase φc taken at one or more time instants when the network element 301 is capable of utilizing the primary timing signal.

In a network element according to an exemplifying and non-limiting embodiment of the invention, the processing system 311 is configured to compute the corrective constant C on the basis of a) the propagation speed of the auxiliary signal and b) differences between a first distance from the source of the auxiliary signal, i.e. the radio station 307, to the network element 301 and each of one or more second distances from the source of the auxiliary signal to the one or more other network elements, i.e. the network elements 302 and 303.

In a network element according to an exemplifying and non-limiting embodiment of the invention, the processing system 311 is configured to read the corrective constant C from memory capable of storing data received from outside the network element.

In a network element according to an exemplifying and non-limiting embodiment of the invention, the processing system 311 is configured to recognize repetitive waveform patterns from the auxiliary signal received from the radio station 307. The processing system 311 may further comprise a frequency multiplier and/or a frequency divider for changing the frequency of a preliminary timing signal based on the recognized repetitive waveform patterns so as to produce the auxiliary timing signal.

In a network element according to an exemplifying and non-limiting embodiment of the invention, the processing system 311 comprises a frequency multiplier and/or a frequency divider for changing the frequency of a carrier wave of the auxiliary signal so as to produce the auxiliary timing signal. In this case, the auxiliary signal can be for example an amplitude modulated "AM" broadcast radio signal.

In a network element according to an exemplifying and non-limiting embodiment of the invention, the processing system 311 is configured to compute a weighted arithmetic mean of the timing phases of the auxiliary timing signals related to the network elements 302 and 303. In this case, the weighted arithmetic mean represents the above-mentioned corrective timing phase φc. The weight coefficients used in the weighted arithmetic mean can be for example dependent on distances from the network element 301 to the network elements 302 and 303. Advantageously, a longer distance corresponds to a smaller weight coefficient and a shorter distance corresponds to a greater weight coefficient.

In a network element according to an exemplifying and non-limiting embodiment of the invention, the control system 315 is configured to control the data transfer interface 312 to transmit, to the network elements 302 and 303, query messages which request the network elements 302 and 303 to transmit correction data to the network element 301. The correction data expresses the timing phases of the auxiliary timing signals of the network elements 302 and 303. In this case, the network element 301 receives each of these timing phases from a different network element, and thus the corrective timing phase φc is composed locally in the network element 301. This may comprise for example computing the above-mentioned weighted arithmetic mean.

In the exemplifying case where the network element comprises the radio receiver 313 for receiving the primary timing signal, the control system 315 is advantageously configured to control the data transfer interface 312 to transmit, to the network elements 302 and 303, information indicative of the timing phase of the auxiliary timing signal of the network element 301 so as to enable each of the network elements 302 and 303 to generate a secondary timing signal than can be used in lieu of the primary timing signal transmitted by the satellite system.

In a network element according to an exemplifying and non-limiting embodiment of the invention, the control system 315 is configured to control the data transfer interface 312 to transmit a query message to a server 304 of the data transfer network 330 so as to request the server to transmit the above-mentioned correction data to the network element. In this case, the corrective timing phase φc can be composed either in the server 304 or in the network element 301, e.g. the above mentioned weighted arithmetic mean can be computed either in the server 304 or in the network element 301.

In the exemplifying case where the network element comprises the radio receiver 313 for receiving the primary timing signal, the control system 315 is advantageously configured to control the data transfer interface 312 to transmit, to the server 304, information indicative of the timing phase of the auxiliary timing signal of the network element 301 so as to enable other network elements which have access to the server 304 to generate a secondary timing signal than can be used in lieu of the primary timing signal transmitted by the satellite system.

The control system 315 can be implemented with one or more processor circuits, each of which can be a programmable processor circuit provided with appropriate software, a dedicated hardware processor such as for example an application specific integrated circuit "ASIC", or a configurable hardware processor such as for example a field programmable gate array "FPGA".

Figure 4:
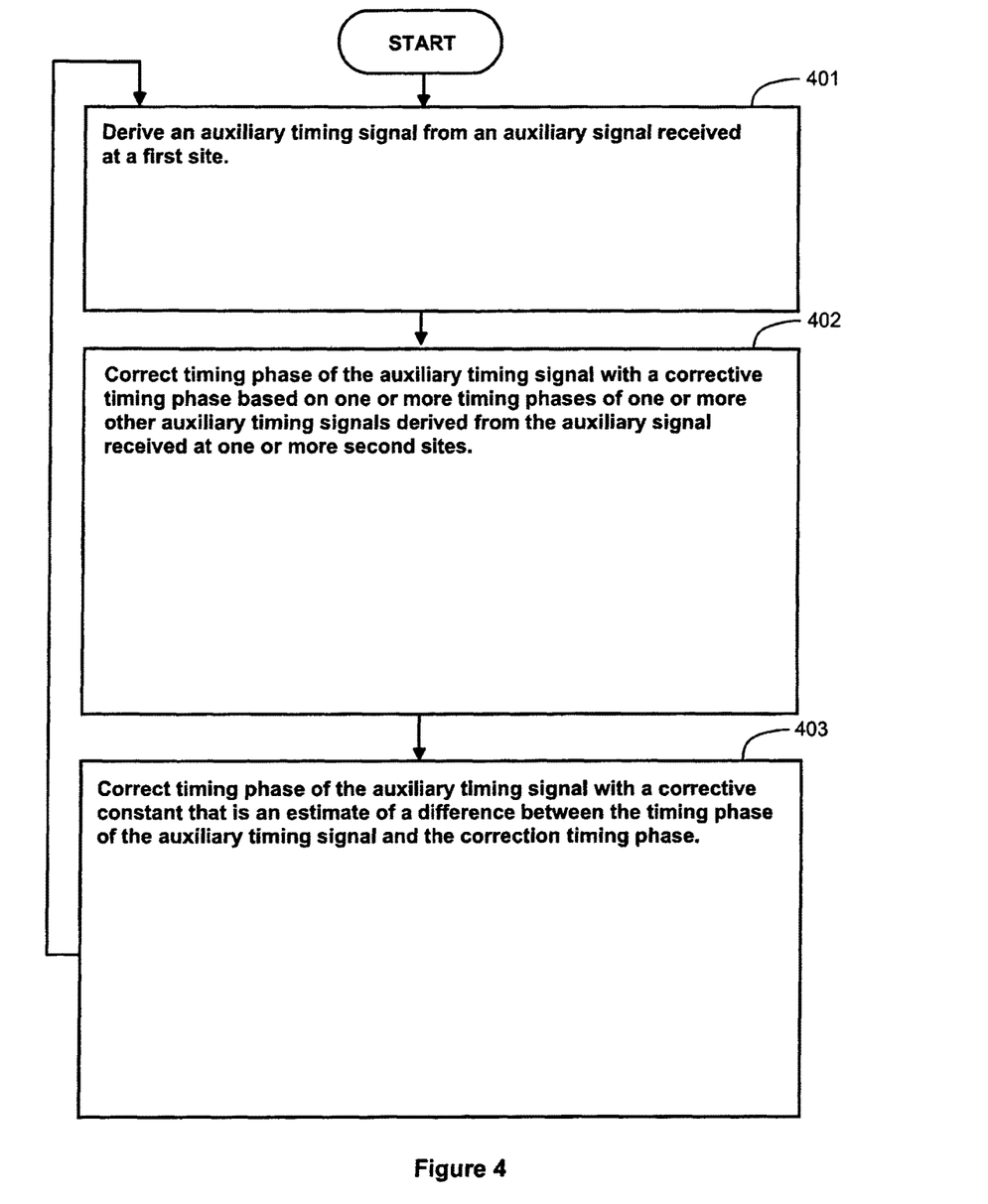
FIG. 4 shows a flowchart of a method according to an exemplifying and non-limiting embodiment of the invention for generating a secondary timing signal which is synchronous with a primary timing signal.

FIG. 4 shows a flowchart of a method according to an exemplifying and non-limiting embodiment of the invention for generating a secondary timing signal which is synchronous with a primary timing signal. The method comprises the following actions:

action 401: deriving an auxiliary timing signal from an auxiliary signal received at a first site, action 402: correcting the timing phase of the auxiliary timing signal with a corrective timing phase φc based on one or more timing phases of one or more other auxiliary timing signals derived from the auxiliary signal received at one or more second sites, the timing phases of the other auxiliary timing signals expressing phase-shifts of the other auxiliary timing signals with respect to the primary timing signal received at the second sites, and action 403: correcting the timing phase of the auxiliary timing signal also with a corrective constant C that is an estimate of a substantially constant difference between the timing phase of the auxiliary timing signal and the corrective timing phase φc, the corrected timing phase representing the timing phase of the secondary timing signal.

A method according to an exemplifying and non-limiting embodiment of the invention comprises computing the corrective constant C on the basis of one or more instantaneous values of the timing phase of the auxiliary timing signal and respective one or more instantaneous values of the corrective timing phase φc taken at one or more time instants when the primary timing signal is available at the first site.

A method according to another exemplifying and non-limiting embodiment of the invention comprises computing the corrective constant C on the basis of a) the propagation speed of the auxiliary signal and b) differences between a first distance from a source of the auxiliary signal to the first site and each of one or more second distances from the source of the auxiliary signal to the one or more second sites.

In a method according to an exemplifying and non-limiting embodiment of the invention, the derivation of the auxiliary timing signal from the auxiliary signal comprises recognizing repetitive waveform patterns from the auxiliary signal.

In a method according to an exemplifying and non-limiting embodiment of the invention, the frequency of a preliminary timing signal based on the recognized repetitive waveform patterns is changed with a frequency multiplier and/or a frequency divider so as to produce the auxiliary timing signal.

In a method according to an exemplifying and non-limiting embodiment of the invention, the frequency of a carrier wave of the auxiliary signal is changed with a frequency multiplier and/or a frequency divider so as to produce the auxiliary timing signal.

A method according to an exemplifying and non-limiting embodiment of the invention comprises computing a weighted arithmetic mean of the timing phases of the other auxiliary timing signals. The weighted arithmetic mean represents the corrective timing phase φc.

In a method according to an exemplifying and non-limiting embodiment of the invention, the weight coefficients of the weighted arithmetic mean are dependent on distances from the first site to the second sites so that a longer one of the distances corresponds to a smaller one of the weight coefficients and a shorter one of the distances corresponds to a greater one of the weight coefficients.

A computer program according to an exemplifying and non-limiting embodiment of the invention comprises computer executable instructions for controlling a programmable processing system to carry out actions related to a method according to any of the above-described exemplifying and non-limiting embodiments of the invention.

A computer program according to an exemplifying and non-limiting embodiment of the invention comprises software modules for generating a secondary timing signal that is synchronous with a primary timing signal. The software modules comprise computer executable instructions for controlling a programmable processing system to:

derive an auxiliary timing signal from an auxiliary signal received at a first site, correct the timing phase of the auxiliary timing signal with a corrective timing phase φc based on one or more timing phases of one or more other auxiliary timing signals derived from the auxiliary signal received at one or more second sites, the timing phases of the other auxiliary timing signals expressing phase-shifts of the other auxiliary timing signals with respect to the primary timing signal received at the second sites, and correct the timing phase of the auxiliary timing signal also with a corrective constant C that is an estimate of a substantively constant difference between the timing phase of the auxiliary timing signal and the corrective timing phase φc, the corrected timing phase representing the timing phase of the secondary timing signal.

The software modules can be e.g. subroutines or functions implemented with a suitable programming language and with a compiler suitable for the programming language and the programmable processing system under consideration.

A computer program product according to an exemplifying and non-limiting embodiment of the invention comprises a computer readable medium, e.g. a compact disc "CD", encoded with a computer program according to an exemplifying embodiment of invention A signal according to an exemplifying and non-limiting embodiment of the invention is encoded to carry information defining a computer program according to an exemplifying embodiment of invention.

The specific examples provided in the description given above should not be construed as limiting the scope and/or the applicability of the appended claims.

What is claimed is:

1. A device for generating a secondary timing signal that is synchronous with a primary timing signal being a radio signal receivable at a plurality of sites, the device comprising:

a receiver for receiving an auxiliary signal being another radio signal receivable at least by the plurality of sites;

a clock signal generator for generating the secondary timing signal; and a processing system configured to:

derive a first auxiliary timing signal from the received auxiliary signal;

receive, from at least one remote site, a timing phase of at least one second auxiliary timing signal, the second auxiliary timing signal being based on the auxiliary signal received at the remote site and the timing phase of the second auxiliary timing signal expressing a phase-shift of the second auxiliary timing signal with respect to the primary timing signal received at the remote site; and apply a timing phase correction to the derived first auxiliary timing signal by utilizing the following i) and ii) to generate a corrected timing phase of the first auxiliary timing signal:

i) a corrective timing phase based on the timing phase of the at least one second auxiliary timing signal; and ii) a corrective constant being an estimate of a difference between the timing phase of the first auxiliary timing signal and the corrective timing phase, wherein the processing system of the device is configured to control the clock signal generator of the device by utilizing the corrected timing phase of the first auxiliary timing signal so as to drive a timing phase of the secondary timing signal to be the corrected timing phase of the first auxiliary timing signal.

2. The device according to claim 1, further comprising a primary signal receiver for receiving the primary timing signal; wherein the processing system is configured to compute the corrective constant on the basis of one or more instantaneous values of the timing phase of the first auxiliary timing signal and respective one or more instantaneous values of the corrective timing phase taken at one or more time instants when the primary timing signal is available to the device, the timing phase of the first auxiliary timing signal expressing a phase-shift of the first auxiliary timing signal with respect to the primary timing signal when the primary timing signal is available to the device.

3. The device according to claim 1, wherein the processing system is configured to compute the corrective constant on the basis of a) the propagation speed of the auxiliary signal and b) a difference between a first distance from a source of the auxiliary signal to the device and a second distance from the source of the auxiliary signal to the remote site.

4. The device according to claim 1, wherein the processing system is configured to recognize repetitive waveform patterns from the auxiliary signal when deriving the first auxiliary timing signal from the first auxiliary signal.

5. The device according to claim 1, wherein the processing system is configured to compute the corrective timing phase based on a weighted arithmetic mean of the timing phase of the second auxiliary timing signal, and one or more corresponding timing phases of one or more additional second auxiliary timing signals derived from the auxiliary signal received in one or more additional remote sites.

6. The device according to claim 5, wherein the processing system is configured to compute the weighted arithmetic mean using weight coefficients dependent on distances from the device to the remote sites so that a longer one of the distances corresponds to a smaller one of the weight coefficients and a shorter one of the distances corresponds to a greater one of the weight coefficients.

7. The device according to claim 1, wherein the auxiliary signal is one selected from the following list: LORAN-C, eLORAN, WWVB, and DFC-77.

8. A network element comprising:
a data transfer interface for transmitting data to a data transfer network and for receiving data from the data transfer network, and
a device for generating a secondary timing signal that is synchronous with a primary timing signal being a radio signal receivable at a plurality of sites,
wherein the device comprises:
a first radio receiver for receiving an auxiliary signal being another radio signal receivable at a plurality of sites;
a clock signal generator for generating the secondary timing signal; and
a processing system configured to:
derive a first auxiliary timing signal from the received auxiliary signal;
receive, from at least one other network element, a timing phase of at least one second auxiliary timing signal, the second auxiliary timing signal being based on the auxiliary signal received at the other network element and the timing phase of the second auxiliary timing signal expressing a phase-shift of the second auxiliary timing signal with respect to the primary timing signal received at the other network element; and
apply a timing phase correction to the derived first auxiliary timing signal by utilizing the following i) and ii) to generate a corrected timing phase of the first auxiliary timing signal:
i) a corrective timing phase based on the timing phase of the at least one second auxiliary timing signal; and
ii) a corrective constant being an estimate of a difference between the timing phase of the first auxiliary timing signal and the corrective timing phase, wherein the processing system of the device is configured to control the clock signal generator of the device by utilizing the corrected timing phase of the first auxiliary timing signal so as to drive a timing phase of the secondary timing signal to be the corrected timing phase of the first auxiliary timing signal.

9. The network element element according to claim 8, wherein the radio receiver is configured to receive the auxiliary signal from a terrestrial radio system and the network element further comprises a second radio receiver configured to receive the primary timing signal from a satellite system.

10. The network element element according claim 9, wherein the control system is configured to use the secondary timing signal in lieu of the primary timing signal when reception of the primary timing signal at the network element by the second radio receiver has ceased to meet a predetermined quality criterion.

11. The network element according to claim 9, wherein the network element is configured to transmit to the data transfer network, information indicative of the timing phase of the first auxiliary timing signal with respect to the primary timing signal for making the information accessible to other network elements of the data transfer network.

12. The network element element according to claim 8, wherein the auxiliary signal is one selected from the following list: LORAN-C, eLORAN, WWVB, and DFC-77.

13. A method performed by a device for generating a secondary timing signal that is synchronous with a primary timing signal being on a radio signal receivable at a plurality of sites, the method comprising:
generating the secondary timing signal with a clock signal generator;
deriving a first auxiliary timing signal from an auxiliary signal received at a first site, the auxiliary signal being another radio signal receivable at a plurality of sites;
receiving, from at least one second site, a timing phase of at least one second auxiliary timing signal, the second auxiliary timing signal being based on the auxiliary signal received at the second site and the timing phase of the second auxiliary timing signal expressing a phase-shift of the second auxiliary timing signal with respect to the primary timing signal received at the second site; and
correcting a timing phase of the derived first auxiliary timing signal so as to obtain a timing phase for the secondary timing signal,
wherein the timing phase of the first auxiliary timing signal is corrected by utilizing the following i) and ii) to generate a corrected timing phase of the first auxiliary timing signal:
i) a corrective timing phase based on the timing phase of the at least one second auxiliary timing signal; and
ii) a corrective constant being an estimate of a difference between the timing phase of the first auxiliary timing signal and the corrective timing phase,
wherein the method comprises controlling the clock signal generator by utilizing the corrected timing phase of the first auxiliary timing signal so as to drive a timing phase of the secondary timing signal to be the corrected timing phase of the first auxiliary timing signal.

14. The method according to claim 13, wherein the method comprises computing the corrective constant on the basis of at least one instantaneous values of the timing phase of the first auxiliary timing signal and respective at least one instantaneous value of the corrective timing phase taken at time instants when the primary timing signal is available at the first site, the timing phase of the first auxiliary timing signal expressing a phase-shift of the first auxiliary timing signal with respect to the primary timing signal when the primary timing signal is available at the first site.

15. The method according to claim 13, wherein the method comprises computing the corrective constant on the basis of a) the propagation speed of the auxiliary signal and b) a difference between a first distance from a source of the auxiliary signal to the first site and a second distance from the source of the auxiliary signal to the second site.

16. The method according to claim 13, wherein the auxiliary signal is one selected from the following list: LORAN-C, eLORAN, WWVB, and DFC-77.

17. A non-volatile computer readable medium encoded with a computer program for controlling a clock signal generator to generate a secondary timing signal that is synchronous with a primary timing signal being a radio signal receivable at a plurality of sites, the computer program comprising computer executable instructions for controlling a programmable processing system to:
    derive a first auxiliary timing signal from an auxiliary signal received at a first site, the auxiliary signal being another radio signal receivable at a plurality of sites; and
    correct a timing phase of the derived first auxiliary timing signal so as to obtain a timing phase for the secondary timing signal,
wherein the computer program comprises computer executable instructions for controlling the programmable processing system to:
    receive, from at least one second site, a timing phase of at least one second auxiliary timing signal, the second auxiliary timing signal being based on the auxiliary signal received at the second site and the timing phase of the second auxiliary timing signal expressing a phase-shift of the second auxiliary timing signal with respect to the primary timing signal received at the second site; and
    correct the timing phase of the first auxiliary timing signal by utilizing the following i) and ii) so as to generate a corrected timing phase of the first auxiliary timing signal:
        i) a corrective timing phase based on the timing phase of the at least one second auxiliary timing signal, and
        ii) a corrective constant being an estimate of a difference between the timing phase of the first auxiliary timing signal and the corrective timing phase, and
wherein the computer program comprises computer executable instructions for controlling the programmable processing system to control the clock signal generator by utilizing the corrected timing phase of the first auxiliary timing signal so as to drive a timing phase of the secondary timing signal to be the corrected timing phase of the first auxiliary timing signal.

18. A data transfer network comprising:
    a first network element, and
    at least one second network element configured to a) derive a network element-specific auxiliary timing signal from an auxiliary signal received at the second network element, b) produce timing information indicative of a timing phase of the derived network element-specific auxiliary timing signal with respect to a primary timing signal received at the second network element, and c) transmit the timing information via the data transfer network so as to make the timing information accessible to the first network element, the primary timing signal being a radio signal receivable at a plurality of sites and the auxiliary signal being another radio signal receivable at a plurality of sites,
wherein the first network element comprises:
    a data transfer interface for transmitting data to the data transfer network and for receiving data from the data transfer network, the received data including the timing information produced by the second network element; and
    a device for generating a secondary timing signal that is synchronous with the primary timing signal,
wherein the device comprises:
    a first radio receiver for receiving the auxiliary signal;
    a clock signal generator for generating the secondary timing signal; and
    a processing system configured to:
        derive a first auxiliary timing signal from the received auxiliary signal;
        apply a timing phase correction to the derived first auxiliary timing signal by utilizing the following i) and ii) so as to generate a corrected timing phase of the first auxiliary timing signal:
            i) a corrective timing phase based on the timing information produced by the second network element; and
            ii) a corrective constant being an estimate of a difference between the timing phase of the first auxiliary timing signal and the corrective timing phase,
wherein the processing system of the device of the first network element is configured to control the clock signal generator of the device of the first network element by utilizing the corrected timing phase of the first auxiliary timing signal so as to drive a timing phase of the secondary timing signal to be the corrected timing phase of the first auxiliary timing signal.

19. The method as claimed in claim 13, wherein the device on which the method is performed is a distributed device.

* * * * *